# 2,752,338

TERTIARY AMINO STEROID COMPOUNDS

Milton E. Herr and Frederick W. Heyl, Kalamazoo, Mich., assignors to The Upjohn Company, Kalamazoo, Mich., a corporation of Michigan No Drawing. Application September 2, 1954, Serial No. 453,966

13 Claims. (Cl. 260—239.5)

The present invention relates to steroid compounds of the androstane series, and is more particularly concerned with novel 11β-hydroxy-4-androstene-3,17-dione 11-keto- and 11β-hydroxy-3,17-di-(tertiaryamino)-3,5,16-androstatrienes and a novel process for the production thereof.

The novel compounds and process of the present invention may be represented by the formulae:

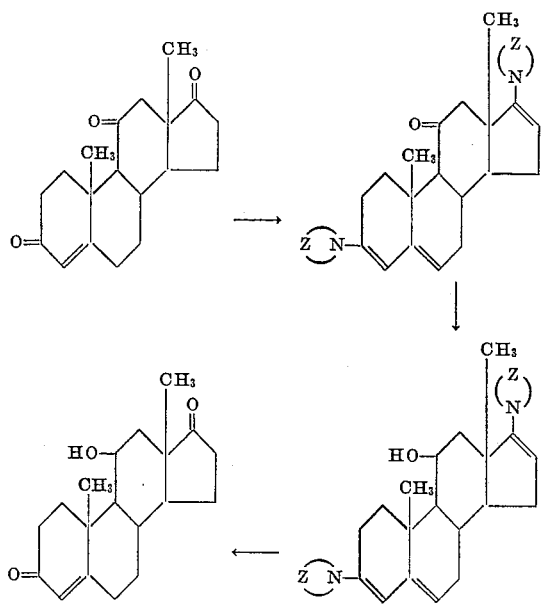

wherein —N⌒Z is a tertiaryamino radical and Z represents the necessary atoms which with N form a saturated monocyclic heterocyclic radical containing at least five and not more than six ring members.

The process of the present invention involves treatment of adrenosterone with a saturated monocyclic heterocyclic secondary amine containing five or six ring members, such as, for example, piperidine, pyrrolidine, morpholine or tetrahydrooxazole to yield a corresponding 3,17-di-enamines, such as, for example, 11-keto-3,17-di-(N-pyrrolidyl)-3,5,16 - androstatriene, 11 - keto - 3,17 - di-(N-piperidyl)-3,5,16-androstatriene, 11 - keto-3,17-di-(N-morpholino)-3,5,16-androstatriene, and other like di-enamines of androsterone. The thus-obtained 3,17-di-enamine is then reduced, preferably with a metallic hydride such as lithium aluminum hydride, to yield an 11β-hydroxy-3,17-di-(N-tertiaryamino)-3,5,16-androstatriene, which on hydrolysis gives 11β-hydroxy-4-androstene-3,17-dione.

It is an object of the present invention to provide novel 11-keto- and 11β-hydroxy-3,17-di-(tertiaryamino)-3,5,16-androstatrienes. Another object of the present invention is provision of a novel process for production of 11-keto- and 11β-hydroxy-3,17-di-(tertiaryamino)-3,5,16-androstatriene and of 11β-hydroxy-4-androstene-3,17-dione. Other objects of the present invention will be apparent to those skilled in the art to which this invention pertains.

The enamine compounds of the present invention are valuable intermediates in the production of known product, such as, for example, 11β-hydroxy-4-androstene-3,17-dione [Reichstein, Helv. Chim. Acta 20, 978 (1937); Hayano et al., J. Biol. Chem. 200, 175 (1953)], which has androgenic and anabolic activity, obtained as shown in the sequence of reactions on page 1 and in Examples 1 through 3. Other uses will be apparent to one skilled in the art.

In carrying out the process of the present invention, adrenosterone is converted to a 3,17-di-enamine. The di-enamine derivatives are preferably prepared by heating adrenosterone with a secondary amine in an organic solvent, removing the water as it is formed in the course of the reaction, and isolating the di-enamine thus-formed. Removal of the water which is formed can be accomplished by azeotropic distillation or by an inorganic water-binding agent such as potassium carbonate, calcium oxide, barium oxide, anhydrous sodium sulfate, calcium sulfate, or the like. Conditions for the formation of such enamines include a reaction temperature between approximately 25 and approximately 150 degrees centigrade, preferably between forty and 110 degrees centigrade, and conveniently at the reflux temperature of the reaction mixture, but always below the decomposition temperature of the ultimate reaction product, i. e., the di-enamine. The reaction time varies according to the reactivity of the amine and the temperature of the reaction. Ordinarily a reaction period of from about thirty minutes to twenty hours is most satisfactory when a temperature within the preferred range is employed. Although the preferred amount of secondary amine employed is in the ratio of three to four moles of amine to one mole of steroid, ratios of about three moles to about twenty moles or more of amine to one mole of steroid are operative. Among the solvents which may be used are diethyl ether, tetrahydrofuran, an excess of the secondary amine reactant, benzene, xylene, toluene, pentane, hexane, and the like.

Sometimes an acid catalyst is added to accelerate the rate of the reaction. For this purpose para-toluenesulfonic acid, naphthalenesulfonic acid, sulfuric acid, and the like may be used. The 3,17-di-enamine of adrenosterone is isolated by conventional means, such as evaporating the excess of secondary amine under reduced pressure using ordinary precautions to preclude moisture. If desired, the thus-obtained 3,17-di-enamine of adrenosterone may be purified by recrystallization, chromatography, extraction or other commonly used procedures but usually the crude product obtained by evaporating the excess amine is used for the further steps of synthesis.

Representative secondary amines which can be employed in the preparation of 3,17-di-enamines of adrenosterone include piperidine, alkylated piperidines, especially β- and γ-methyl-, ethyl-, dimethyl-, propyl-, isopropyl-piperidines, piperidones, especially β- and γ-piperidone, pyrrolidine, β-pyrrolidone, β-alkylated pyrrolidines, tetrahydrooxazole (oxazolidine), 2,4-dimethyltetrahydrooxazole, isooxazolidine, morpholine, 1,3-morpholine and morpholines substituted on the carbon atoms by methyl, ethyl, propyl, isopropyl groups, and other like. The preferred secondary amine is pyrrolidine.

The thus-produced 3,17-di-enamine of adrenosterone is then reduced to yield the respective 3,17-di-(N-tertiary-amino)-11β-hydroxy-3,5,16-androstatriene. The reduction is carried out by dissolving the keto-di-enamine in a solvent, which is unreactive under the reaction condition such as, for example, ether, benzene, tetrahydrofuran, petroleum ether and other like solvents, with ether and tetrahydrofuran preferred. Reducing agents such as, for example, lithium aluminum hydride, lithium borohydride, or sodium borohydride are operative, with lithium aluminum hydride being preferred. In the preferred embodiment of the process, lithium aluminum hydride is admixed with a suitable organic solvent such as, for example, ether or tetrahydrofuran, and the starting 11-keto-dienamine dissolved in a solvent such as, for example, tetrahydrofuran, benzene, or the like, and the admixtures then combined to form the reaction mixture by gradual addition of the steroid solution to the lithium aluminum hydride solution.

The temperature of the reaction mixture is usually maintained between about zero and about 100 degrees centigrade, with a temperature between about room temperature (twenty to thirty degrees centigrade) and the reflux temperature of the reaction mixture being preferred, for a reaction period varying from a few minutes to about four hours or more. When lithium aluminum hydride is used as the reducing agent, the reaction is advantageously first conducted at temperatures between about zero and fifty degrees centigrade, preferably at about room temperature. During the latter phases of the reaction, higher temperatures are utilized, the reflux temperature of the reaction mixture usually being the upper temperature limit. The reactants are preferably admixed and stirred for about five minutes to about one hour at room temperature, twenty to thirty degrees centigrade, and subsequently refluxed for five minutes or longer under atmospheric pressure, the total reaction time depending in part upon the ratio of the starting reactants and the temperatures employed.

The ratio of reducing agent to starting keto-di-enamines may be varied over a wide range, a substantial excess of the reducing agent generally being employed with mole-ratios from two to one and up to fifty to one and above being operative.

11$\beta$-hydroxy-4-androstene-3,17-dione is obtained from the reaction product by conventional procedure. Thus, when employing reducing agents such as lithium aluminum hydride or sodium borohydride, the reaction mixture is hydrolyzed upon completion of the reduction by the cautious addition of water and the organic layer separated from the aqueous layer. The organic layer, after washing and drying, is concentrated to yield the 3,17-di-enamine of 11$\beta$-hydroxy-4-androstene-3,17-dione, which is subsequently hydrolyzed. The hydrolysis of the di-enamine is carried out by heating the enamine, dissolved in a solvent such as, for example, methanol, aqueous methanol, ethanol, propanol, isopropanol, tertiary butanol, and the like, with an acid. In a preferred embodiment of the invention, a buffer solution of acetic acid and sodium acetate in methanol or ethanol having a pH between about 5.5 and 6.8 is used. Lower pH ranges usually result in a decreased yield of hydrolyzed product. The reaction mixture may, for example, be refluxed for a period between two and eight hours. The product, 11$\beta$-hydroxy-4-androstene-3,17-dione, is obtained from the reaction mixture by extraction with an organic solvent, preferably ether, and subsequent evaporation of the extraction solvent. The compounds may be purified, if desired, by recrystallization from organic solvents such as ethyl acetate, or by chromatography.

The following examples are illustrative of the process and products of the present invention but are not to be construed as limiting.

*Example 1.—3,17-di-(N-pyrrolidyl)-3,5,16-androstatriene-11-one*

A mixture of three grams (0.01 mole) of adrenosterone, thirty milliliters of benzene, 3.25 milliliters (0.024 mole) of pyrrolidine, and ten milligrams of para-toluene-sulfonic acid monohydrate was heated under reflux for a period of 165 minutes in a distilling flask equipped with a total reflux condenser and a water trap. The water formed in the reaction is collected in the water trap. The benzene was then removed by distillation under reduced pressure and the yellow, solid residue triturated with fifty milliliters of methanol, whereafter 3,17-di-(N-pyrrolidyl)-3,5-androstadiene-11-one was recovered by filtration. Dried in vacuo the weight of crude 3,17-di-(N-pyrrolidyl)-3,5-androstadiene-11-one was 4.09 grams, the theoretical yield. Recrystallized from ether, the product melted with decomposition at 182 to 190 degrees centigrade.

*Analysis.*—Calculated for $C_{27}H_{38}N_2O$: N, 6.89. Found: N, 7.08.

*Example 2.—3,17-di-(N-pyrrolidyl)-3,5,16-androstatriene-11$\beta$-ol*

A solution of 4.09 grams of 3,17-di-(N-pyrrolidyl)-3,5,16-androstatriene-11-one, dissolved in 100 milliliters of anhydrous tetrafuran, was added over a period of five minutes, with stirring, to a mixture of two grams of lithium aluminum hydride in 350 milliliters of anhydrous ether. The reaction mixture was refluxed for a period of five minutes, whereafter the reaction vessel was cooled in an ice bath. The metal complex was then decomposed by the cautious addition of five milliliters of water. The organic layer was decanted through a fluted filter, and the clear ether solution obtained was washed with water, dried over anhydrous sodium sulfate, and evaporated to yield 3,17-di-(N-pyrrolidyl)-3,5,16-androstatriene-11$\beta$-ol. Infrared analysis confirmed the structure of the di-enamine-11-ol.

*Example 3.—11$\beta$-hydroxy-4-androstene-3,17-dione*

Four grams of 3,17-di-(N-pyrrolidyl)-3,5,16-androstatriene-11$\beta$-ol, sixteen grams of sodium acetate, twenty milliliters of water, ten milliliters of glacial acetic acid, and 200 milliliters of methanol were refluxed for a period of three hours. The reaction mixture was then evaporated to dryness under reduced pressure. The residue was diluted with water and extracted with ether and methylene dichloride. The combined extracts were washed with dilute aqueous sodium carbonate solution and water, and then dried over anhydrous sodium sulfate. Upon evaporation of the solvent there was obtained 2.22 grams (78 percent) of crystalline product of melting point 187 to 190 degrees centigrade. The product was dissolved in eighty milliliters of benzene and passed over a column of 55 grams of activated alumina. The column was eluted, in succession, with fifty milliliters of benzene, 500 milliliters of benzene containing ten percent acetone, 500 milliliters of benzene containing twenty percent acetone and five hundred milliliters of benzene containing fifty percent acetone. The benzene containing ten percent acetone and benzene containing twenty percent acetone eluate solutions provided 11$\beta$-hydroxy-4-androstene-3,17-dione as needles; yield 1.45 grams; melting point 196 to 198 degrees. Recrystallization from chloroform and Skellysolve B hexanes yielded 1.35 grams of long, silky needles melting at 200 degrees centigrade.

*Analysis.*—Calculated for $C_{19}H_{26}O_3$: C, 75.46; H, 8.67. Found: C, 75.90; H, 9.85.

Infrared analysis confirmed the structure postulated for 11$\beta$-hydroxy-4-androstene-3,17-dione.

In the same manner as given in Example 1, other di-enamines of androsterone may be made such as: 3,17-di-(N - morpholino) - 3,5,16-androstatriene-11-one, 3,17-di-(N-piperidino)-3,5,16-androstatriene-11-one, 3,17-di-[N-($\alpha$-methylpiperidino)]-3,5,16-androstatriene-11-one, 3,17-di-[N-($\beta$,$\gamma$-dimethylpiperidino)]-3,5,16-androstatriene-11-one, 3,17-di-[N-($\gamma$-piperidono)]-3,5,16-androstatriene-11-one, 3,17 - di - [N-($\beta$-methylpyrrolidino)]-3,5,16-androstatriene - 11 - one, 3,17-di-[N-($\beta$-isopropylpyrrolidino)]-3,5,16 - androstatriene - 11 - one, 3,17 - di-[N-($\beta$-pyrrolidono)]-3,5,16-androstatriene-11-one, 3,17-di-(N-oxazolidino)-3,5,16-androstatriene-11-one, 3,17-di-[N-isooxazolidino)]-3,5,16-androstatriene-11-one, and the like.

These dienamines may be reduced with a metallic hydride as shown in Example 2, yielding the corresponding representative 11β-hydroxy-di-enamines, such as 3,17-di-(N-morpholino)-3,5,16-androstatriene-11β-ol, 3,17-di-(N-piperidino)-3,5,16-androstatriene-11β-ol, 3,17-di-[N-(γ-methylpiperidino)]-3,5,16-androstatriene-11β-ol, 3,17-di-[N-(β,γ-dimethylpiperidino)]-3,5,16-androstatriene-11β-ol, 3,17-di-[N-(γ-piperidono)]-3,5,16-androstatriene-11β-ol, 3,17-di-[N-(β-methylpyrrolidino)]-3,5,16-androstatriene-11β-ol, 3,17-di-[N-(β-isopropylpyrrolidino)]-3,5,16-androstatriene-11β-ol, 3,17-di-[N-(β-pyrrolidono)]-3,5,16-androstatriene-11β-ol, 3,17-di-(N-oxazolidino)-3,5,16-androstatriene-11β-ol, 3,17-di-(N-isooxazolidino)-3,5,16-androstatriene-11β-ol, and the like.

In the same manner as given in Example 3, these 3,17-di-(N-tertiaryamino)-3,5,16-androstatriene-11β-ols may be hydrolyzed to yield 11β-hydroxy-4-androstene-3,17-dione.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. 3,17-di-(N-pyrrolidyl)-3,5,16-androstatriene-11-one.
2. 3,17-di-(N-pyrrolidyl)-3,5,16-androstatriene-11-ol.
3. The process which comprises: heating adrenosterone with a saturated monocyclic heterocyclic secondary amine containing at least five and not more than six ring members selected from the group consisting of piperidine, pyrrolidine, morpholine and tetrahydrooxazoline and separating the thus-produced 3,17-di-(N-tertiaryamino)-3,5,16-androstatriene-11-one.
4. The process which comprises: heating adrenosterone in solution with a pyrrolidine and separating the thus-produced 3,17-di-(N-pyrrolidyl)-3,5,16-androstatriene-11-one.
5. The process which comprises: heating adrenosterone dissolved in an organic solvent with pyrrolidine in the presence of an acid catalyst and separating the thus-produced 3,17-di-(N-pyrrolidyl)-3,5,16-androstatriene-11-one.
6. The process of claim 5 wherein the acid catalyst is para-toluenesulfonic acid.
7. The process which comprises: heating adrenosterone in solution with a saturated monocyclic heterocyclic secondary amine containing at least five and not more than six ring members selected from the group consisting of piperidine, pyrrolidine, morpholine and tetrahydrooxazoline, separating the thus-produced 3,17-di-(N-tertiaryamino)-3,5,16-androstatriene-11-one, reducing the 11-keto-di-enamine with a metallic hydride and separating the thus-produced 3,17-di-(N-tertiaryamino)-3,5,16-androstatriene-11-ol.
8. The process which comprises: heating adrenosterone dissolved in an organic solvent which is not reactive under the reaction condition with pyrrolidine in the presence of an acid catalyst, separating the thus-produced 3,17-di-(N-pyrrolidyl)-3,5,16-androstatriene-11-one, reducing the 11-keto-di-enamine with lithium aluminum hydride, and separating the thus-produced 3,17-di-(N-pyrrolidyl)-3,5,16-androstatriene-11-ol.
9. The process of claim 8 wherein the acid catalyst is para-toluenesulfonic acid.
10. In a process for the production of 11β-hydroxy-4-androstene-3,17-dione, the steps which comprise: heating adrenosterone in solution with a saturated monocyclic heterocyclic secondary amine containing at least five and not more than six ring members selected from the group consisting of piperidine, pyrrolidine, morpholine and tetrahydrooxazoline, separating the thus-produced 3,17-di-(N-tertiaryamino)-3,5,16-androstatriene-11-ol, reducing the 11-keto-di-enamine with a metallic hydride and hydrolyzing the thus-produced 3,17-di-(N-tertiaryamino)-3,5,16-androstatriene-11-ol through heating in an aqueous alcoholic buffer solution containing glacial acetic acid and sodium acetate at a pH between about 5.5 to 6.8, for a period of two to eight hours to yield 11β-hydroxy-4-androstene-3,17-dione.
11. In a process for the production of 11β-hydroxy-4-androstene-3,17-dione, the steps which comprise: heating adrenosterone, dissolved in an organic solvent with pyrrolidine in the presence of an acid catalyst, reducing the thus-produced 3,17-di-(N-pyrrolidyl)-3,5,16-androstatriene-11-one, with lithium aluminum hydride, and hydrolyzing the thus-produced 3,17-di-(N-pyrrolidyl)-3,5,16-androstatriene-11-ol through heating in an aqueous alcoholic buffer solution containing glacial acetic acid and sodium acetate at a pH between about 5.5 to 6.8, for a period of two to eight hours to yield 11β-hydroxy-4-androstene-3,17-dione.
12. The process of claim 11 wherein the acid catalyst is para-toluenesulfonic acid.
13. A 3,17-di-(N-tertiaryamino)-3,5,16-androstatriene of the formula

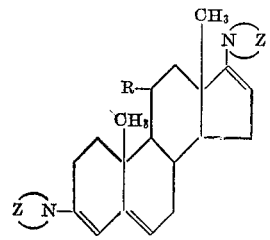

wherein the tertiaryamino radical —N͡Z is selected from the group consisting of piperidino, pyrrolidino, morpholino and tetrahydrooxazolino and wherein R is selected from the group consisting of 11β-hydroxy and 11-keto.

No references cited.